(12) United States Patent
Kim et al.

(10) Patent No.: US 10,427,500 B2
(45) Date of Patent: Oct. 1, 2019

(54) CENTRALIZED ENERGY MODULE FOR VEHICLE

(71) Applicants: HYUNDAI MOTOR COMPANY, Seoul (KR); KIA MOTORS CORPORATION, Seoul (KR)

(72) Inventors: Jae Yeon Kim, Hwaseong-si (KR); Wan Je Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 70 days.

(21) Appl. No.: 15/797,183

(22) Filed: Oct. 30, 2017

(65) Prior Publication Data
US 2019/0047373 A1 Feb. 14, 2019

(30) Foreign Application Priority Data
Aug. 9, 2017 (KR) .................... 10-2017-0100983

(51) Int. Cl.
*B60H 1/32* (2006.01)
*B60H 1/00* (2006.01)

(52) U.S. Cl.
CPC ....... *B60H 1/3229* (2013.01); *B60H 1/00342* (2013.01); *B60H 1/00899* (2013.01);
(Continued)

(58) Field of Classification Search
CPC .............. B60H 1/3229; B60H 1/00899; B60H 1/3227; B60H 1/00342;
(Continued)

(56) References Cited

U.S. PATENT DOCUMENTS 5,222,372 A * 6/1993 DeRees ............... B60H 1/0005
62/237
6,230,508 B1   5/2001 Baker et al.
(Continued)

FOREIGN PATENT DOCUMENTS

| JP | 2010274828 A | * 12/2010 |
| JP | 2016203659 A | * 12/2016 |
| KR | 10-2012-0014621 A | 2/2012 |

OTHER PUBLICATIONS

Paul Weissler "Secondary loop and heat pump climate control under evaluation once more", SAE International Article, Dec. 9, 2015.
(Continued)

*Primary Examiner* — Emmanuel E Duke
(74) *Attorney, Agent, or Firm* — Morgan, Lewis & Bockius LLP

(57) ABSTRACT

A centralized energy (CE) module for a vehicle includes: a base plate; a compressor mounted on the base plate and compressing refrigerant; a condenser mounted on the base plate at a location spaced apart from the compressor and heat-exchanges the compressed refrigerant supplied from the compressor with a coolant which flows into the condenser to condense the refrigerant; an evaporator mounted on the base plate at a location spaced apart from the condenser and evaporating the refrigerant supplied from an expansion valve integrally mounted through heat-exchange with the coolant which flows into the evaporator and supplying the evaporated refrigerant to the compressor; and an accumulator connected with the evaporator through the expansion valve, and supplied only a gas refrigerant among the evaporated refrigerants to the compressor while passing through the evaporator.

17 Claims, 11 Drawing Sheets

(52) U.S. Cl.
CPC ....... *B60H 1/3227* (2013.01); *B60H 1/32284* (2019.05); *B60H 1/00278* (2013.01); *B60H 2001/00928* (2013.01)

(58) Field of Classification Search
CPC ...... B60H 2001/00928; B60H 1/00278; F25B 40/00; F25B 25/005; F25B 13/00; F25B 41/003; F25B 39/04
See application file for complete search history.

(56) References Cited

U.S. PATENT DOCUMENTS

| | | |
|---|---|---|
| 8,517,087 B2 | 8/2013 | Zeigler et al. |
| 2010/0058800 A1* | 3/2010 | Setoguchi ............... F25B 13/00 62/513 |
| 2011/0113821 A1* | 5/2011 | Chu ..................... F25B 43/003 62/503 |
| 2016/0047559 A1* | 2/2016 | Swanson ................. F24F 1/04 62/115 |

OTHER PUBLICATIONS

Y. Hwang et al., "Experimental cooling and energy performance of motor vehicle ac using HFC-152A", SAE International Paper #15TMSS-0042, Center for Environmental Energy Engineering, Department of Mechanical Engineering, University of Maryland, College Park, MD.

Stephen O. Andersen et al., "R-152a Mobile A/C System", 2002 SAE Automotive Alternate Refrigerant Systems Symposium, General Motors.

Qinghong Peng et al., "Progress in Heat Pump Air Conditioning Systems for Electric Vehicles A Review", MDPI Energies 2016, vol. 9, No. 240, Mar. 25, 2016.

K. Wang et al., "Review of secondary loop refrigeration systems," ScienceDirect, International Journal of Refrigeration vol. 33, (2010) pp. 212-234.

* cited by examiner

CENTRALIZED ENERGY MODULE FOR VEHICLE

CROSS-REFERENCE TO RELATED APPLICATION

This application claims the benefit of priority to Korean Patent Application No. 10-2017-0100983 filed in the Korean Intellectual Property Office on Aug. 9, 2017, the entire content of which is incorporated herein by reference.

TECHNICAL FIELD

The present disclosure relates to a centralized energy (CE) module for a vehicle, and more particularly, to a centralized energy (CE) module for a vehicle, which cools or heats an internal of the vehicle using high-temperature coolant and low-temperature coolant by selectively exchanging thermal energy with phase-changed refrigerant and coolant of which phases are changed while being circulated in an internal portion of the CE module.

BACKGROUND

In general, an air conditioner for an automobile includes an air conditioner system configured for circulating a refrigerant to heat or cool an internal of the automobile.

Such an air conditioner system which maintains a comfortable internal environment by keeping a temperature of the internal of the automobile at an appropriate range, regardless of an external temperature change, is configured to heat or cool the internal of the automobile by thermal energy-exchange by an evaporator while the refrigerant discharged by driving a compressor passes through a condenser, a receiver drier, an expansion valve, and the evaporator then circulates to the compressor again.

That is, in the air conditioner means, high-temperature high-pressure gaseous refrigerant compressed by the compressor is condensed through the condenser, and thereafter, evaporated in the evaporator through the receiver drier and the expansion valve to lower a temperature and humidity of the internal in a summer cooling mode.

In recent years, as interest in energy efficiency and environmental pollution problem has been increasing, there has been a demand for the development of environmentally friendly vehicles configured to substantially replace internal combustion engine vehicles. The environmentally friendly vehicles are usually fuel cells or electric vehicles driven by electricity or a hybrid vehicle driven by an engine and a battery.

Among the environmentally friendly vehicles, the electric vehicle and the hybrid vehicle do not use a separate heater unlike an air conditioner of a general vehicle and the air conditioner applied to the environmentally friendly vehicle is generally referred to as a heat pump system.

On the other hand, in the case of the electric vehicle, chemical reaction energy of oxygen and hydrogen is converted into electrical energy to generate a driving force. In the present process, since thermal energy is generated by the chemical reaction in the fuel cell, effectively removing the generated heat is essential for securing optimal performance of the fuel cell.

In addition, even in the hybrid vehicle, a motor is driven using electricity supplied from the fuel cell, or an electric battery, together with an engine that operates by general fuel combustion to generate the driving force, and as a result, the performance of the motor can be secured only by effectively removing the heat generated from the fuel cell or the battery and the motor.

As a result, in the hybrid vehicle or the electric vehicle in the related art, a battery cooling system needs to be separately formed with a separate sealing circuit together with a cooler device and the heat pump system to prevent excessive heat generation in the motor, electric components, and the battery including the fuel cell.

Accordingly, a size and a weight of a cooling module disposed in a front portion of the vehicle increase, and a layout of connection pipes that supply the refrigerant and the coolant to the heat pump system, the cooler, and the battery cooling system is complicated in an engine compartment.

Furthermore, the battery cooling system is separately provided, which warms up or cools the battery according to a status of the vehicle for the battery to provide optimal performance, and as a result, multiple valves for connection with the respective connection pipes are adopted and noise and vibration due to frequent opening and closing operations of the valves are transferred to the internal of the vehicle, degrading a ride comfort.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a CE module for a vehicle, which selectively heat-exchanges heat energy generated from refrigerant when the refrigerant is condensed and evaporated and controls a temperature of an interior of a vehicle by using each of low-temperature or high-temperature coolant which is heat-exchanged.

An exemplary embodiment of the present disclosure provides a CE module for a vehicle, including: a base plate; a compressor mounted on the base plate and compressing refrigerant; a condenser mounted on the base plate at a location spaced apart from the compressor and heat-exchanges the compressed refrigerant supplied from the compressor with coolant which flows into the condenser to condense the refrigerant; an evaporator mounted on the base plate at a location spaced apart from the condenser and evaporating the refrigerant supplied from an expansion valve integrally mounted through heat-exchange with the coolant which flows into the evaporator and supplying the evaporated refrigerant to the compressor; and an accumulator connected with the evaporator through the expansion valve, and supplied only a gaseous refrigerant among the evaporated refrigerants to the compressor while passing through the evaporator.

An overcooling heat exchanger may be integrally provided in the evaporator, which overcools the refrigerant supplied from the condenser through mutual heat-exchange with low-temperature and low-pressure gas refrigerant passing through the evaporator and supplies the overcooled refrigerant to the expansion valve.

The condenser may include a condensing fin having multiple first and second paths disposed alternatively to each other, respectively therein by stacking multiple plates and heat-exchanging the refrigerant passing through the first paths and the coolant passing through the second paths with each other.

The compressor may be connected with the condenser through a first connection pipe, the condenser may be connected with the overcooling heat exchanger through a second connection pipe, the expansion valve may be connected with the overcooling heat exchanger through a third connection pipe and may be connected with the accumulator through a fourth connection pipe, and the accumulator may be connected with the compressor through a fifth connection pipe.

The evaporator may include an evaporator having multiple third and fourth paths disposed alternatively to each other therein by stacking multiple plates and heat-exchanging the refrigerant passing through the third paths and the coolant passing through the fourth paths with each other.

The overcooling heat exchanger may be integrally formed in the evaporator and has multiple fifth and sixth paths disposed alternatively to each other, respectively therein by stacking multiple plates.

The overcooling heat exchanger may flow low-temperature and low-pressure gas refrigerant supplied from the evaporator to the sixth paths and flows the condensed refrigerant supplied from the condenser to the fifth paths.

The condenser may further include a sub condensing fin having multiple seventh and eighth paths disposed alternatively to each other therein by integrally stacking multiple plates and heat-exchanging the refrigerant passing through the seventh paths and the coolant passing through the eighth paths with each other.

The coolant which flows into the condenser may first pass through the sub condensing fin and thereafter, flows into the condensing fin.

The refrigerant discharged from the condenser may pass through the overcooling heat exchanger and thereafter, flows into the evaporator through the expansion valve.

The evaporator and the condenser may be connected with each other through coolant pipes so that the coolant flows into and is discharged from the evaporator and the condenser, and the respective coolant pipes may be connected with a heating, ventilation, and air conditioning (HVAC) module.

High-temperature coolant heat-exchanged while passing through the condenser may be supplied to the HVAC module to heat an interior of a vehicle when a heating mode of the vehicle is actuated.

Low-temperature coolant heat-exchanged while passing through the evaporator may be supplied to the HVAC module to cool the interior of the vehicle when a cooling mode of the vehicle is actuated.

The condenser and the evaporator may be formed as a water-cooled heat exchanger in which the coolant is circulated.

The refrigerant may be R152-a or R744 refrigerant.

On the base plate, a cover housing may be mounted wherein the compressor, the condenser, the evaporator, and the accumulator are disposed in the cover housing.

A damper may be mounted between the base plate and the compressor.

According to the exemplary embodiment of the present disclosure, a CE module for a vehicle selectively heat-exchanges heat energy generated from refrigerant when the refrigerant is condensed and evaporated and controls a temperature of an interior of a vehicle by using each of low-temperature or high-temperature coolant which is heat-exchanged to simplify a whole system and simplify a layout of a connection pipe in which the refrigerant is circulated.

Further, the CE module for a vehicle can enhance operation efficiency by using high-performance R152-a or R744 refrigerant and prevent noise, vibration, and operation instability as compared with an air conditioner means in the related art.

Furthermore, manufacturing cost can be reduced and a weight can be reduced through modularization of an apparatus and spatial utilization can be enhanced.

DETAILED DESCRIPTION OF THE EMBODIMENTS

Figure 1:
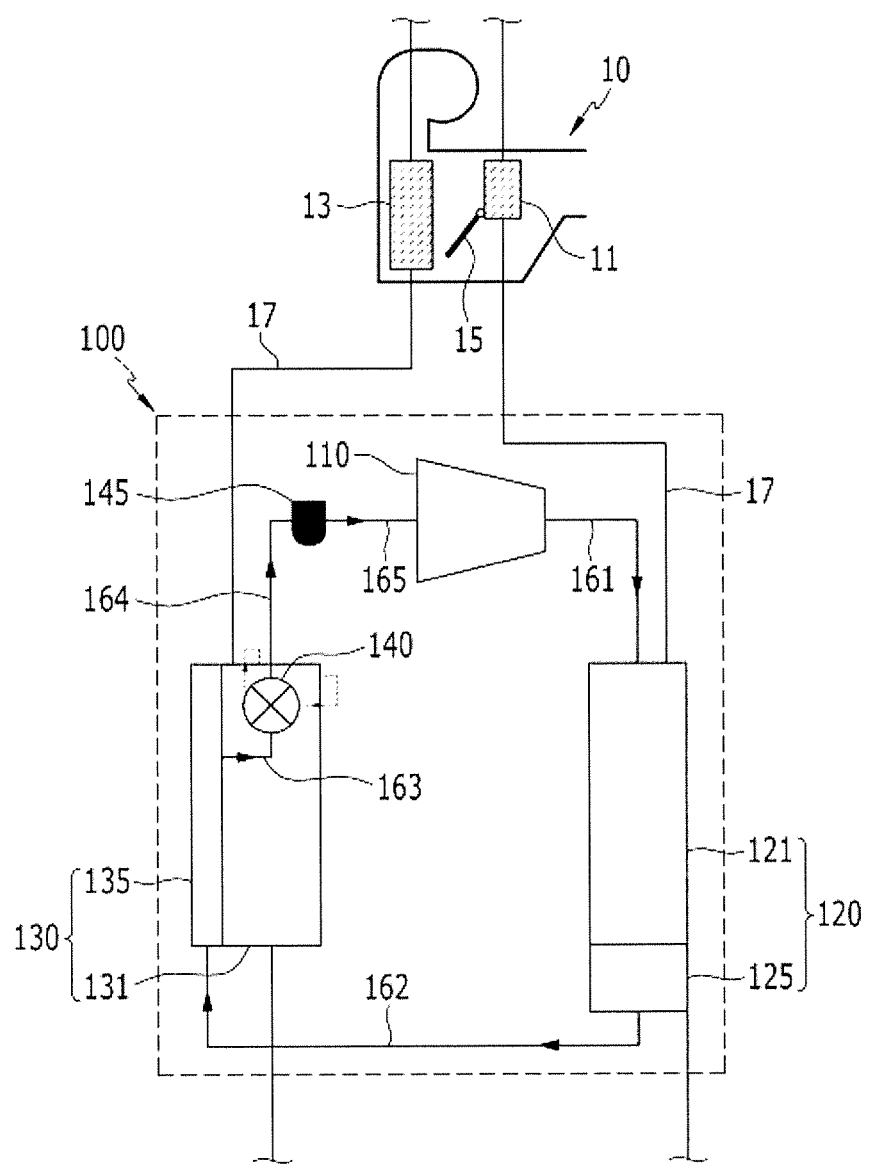
FIG. 1 is a configuration diagram of a CE module for a vehicle according to an exemplary embodiment of the present disclosure.
Figure 2:
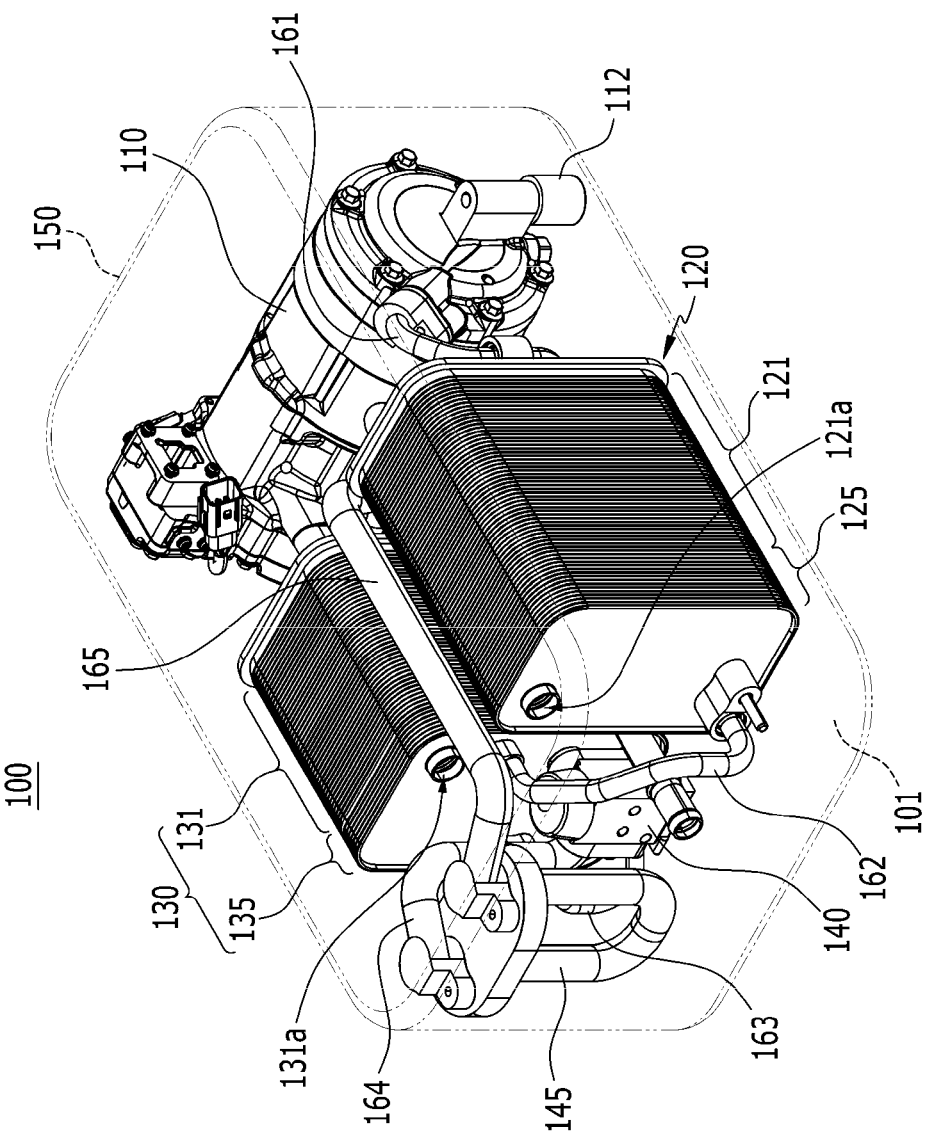
FIG. 2 is a perspective view of the CE module for a vehicle according to the exemplary embodiment of the present disclosure.
Figure 3:
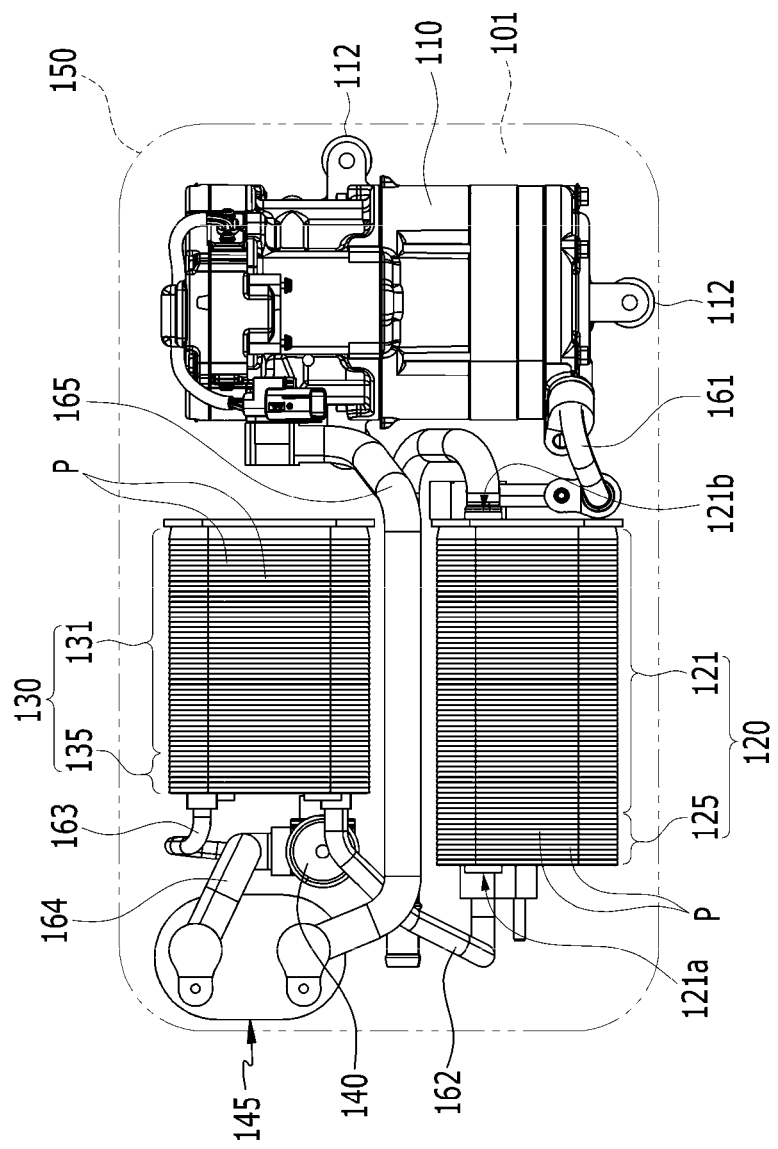
FIG. 3 is a plan view of the CE module for a vehicle according to the exemplary embodiment of the present disclosure.
Figure 4:
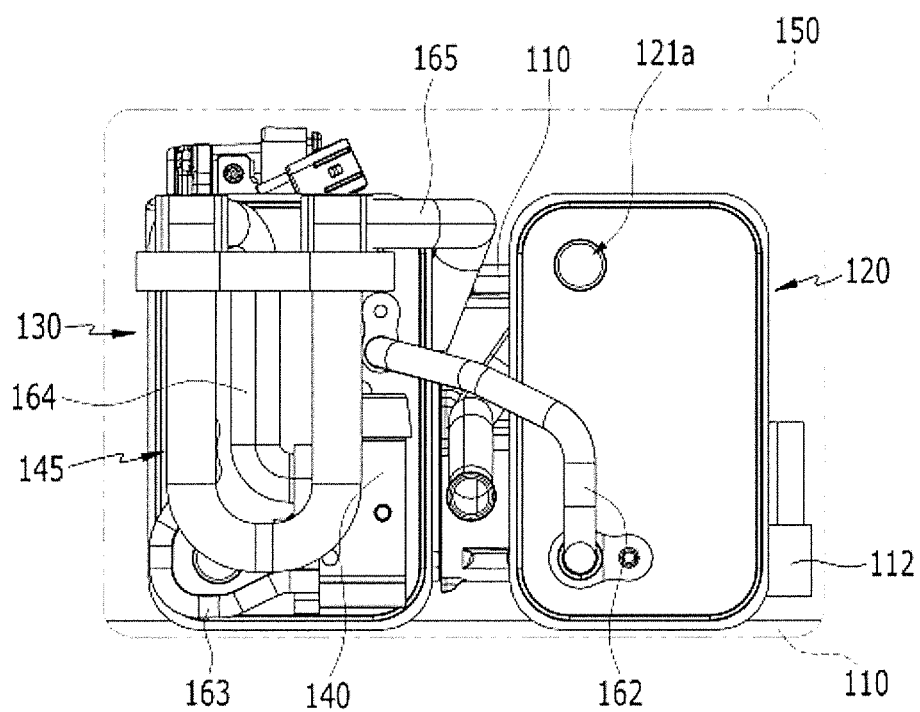
FIG. 4 is a side view of the CE module for a vehicle according to the exemplary embodiment of the present disclosure.

An exemplary embodiment of the present disclosure will hereinafter be described in detail with reference to the accompanying drawings.

Prior to this, configurations illustrated in the exemplary embodiments and drawings disclosed in the present specification are only the most preferred embodiment of the present disclosure and do not represent all of the technical spirit of the present disclosure, and thus it is to be understood that various equivalents and modified examples, which may replace the configurations, are possible when filing the present application.

The drawings and description are to be regarded as illustrative in nature and not restrictive and like reference numerals designate like elements throughout the specification.

Since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

In addition, throughout the specification, unless explicitly described to the contrary, the word "comprise" and variations such as "comprises" or "comprising", will be understood to imply the inclusion of stated elements but not the exclusion of any other elements.

In addition, the terms "unit", "means", "part", and "member", which are described in the specification, mean a unit of a comprehensive configuration that performs at least one function or operation.

FIG. 1 is a configuration diagram of a centralized energy (CE) module for a vehicle according to an exemplary embodiment of the present disclosure.

A CE module 100 for a vehicle according to the exemplary embodiment of the present disclosure is applied to a heat pump system. The CE module 100 selectively heat-exchanges heat energy generated from refrigerant when the refrigerant is condensed and evaporated with coolant to perform cooling or heating of the vehicle by using only low-temperature or high-temperature coolant.

Herein, the heat pump system may be applied to an electric vehicle. The heat pump system may include the CE module 100 according to the exemplary embodiment of the present disclosure together with a cooling unit, a battery module, and a heating, ventilation, and air conditioning (HVAC) module 10.

The cooling unit circulates the coolant cooled by a radiator R through actuating a water pump to cool electric components not to be overheated.

The battery module may be connected with the cooling unit, the coolant may be circulated in the battery module through actuating the water pump, and the battery module may supply power to the electric components.

Referring to FIG. 1, in the exemplary embodiment, the heating, ventilation, and air conditioning (HVAC) module 10 includes an internal heater 11, a cooler 13, and an opening/closing door 15.

The internal heater 11 and the cooler 13 are connected with the CE module 100 through a coolant pipe 17. In addition, the opening/closing door 15 is provided between the internal heater 11 and the cooler 13. The opening/closing door 15 controls outdoor air passing through the cooler 13 to selectively flow into the internal heater 11 according to cooling, heating, and heating/dehumidifying modes.

That is, the opening/closing door 15 is opened so that the outdoor air passing through the cooler 13 flows into the internal heater 11 in the heating mode of the vehicle. On the contrary, the internal heater 11 side of the opening door 15 is closed so that the outdoor air cooled while passing through the cooler 13 immediately flows into the vehicle.

In addition, the centralized energy (CE) module 100 according to the exemplary embodiment of the present disclosure selectively heat-exchanges the heat energy generated when the refrigerant which is circulated in the CE module 100 is condensed and evaporated with the coolant and supplies each of the low-temperature or high-temperature coolant which is heat-exchanged to the HVAC module 10.

Herein, the refrigerant may be high-performance R152-a or R744 refrigerant.

When the heating mode of the vehicle is actuated, the high-temperature coolant is supplied from the CE module 100 to the internal heater 11. On the contrary, when the cooling mode of the vehicle is actuated, the low-temperature coolant is selectively supplied from the CE module 100 to the cooler 13.

In the exemplary embodiment, the CE module 100 includes a base plate 101, a compressor 110, a condenser 120, an evaporator 130, an expansion valve 140, an accumulator 145, and a cover housing 150.

In the exemplary embodiment, the base plate 101 is formed in a quadrangular plate shape.

The compressor 110 is mounted on one surface of the base plate 101. The compressor 110 compresses gas-state refrigerant discharged from the evaporator 130.

Herein, the compressor 110 may be connected with the condenser 120 through a first connection pipe 161.

Further, a damper 112 may be mounted between the base plate 101 and the compressor 110.

The damper 112 may minimize transfer of vibration and noise generated when the compressor 110 is actuated to the base plate 101. The damper 112 may be made of a rubber material as a material.

The condenser 120 is mounted on the base plate 101 at a location spaced apart from the compressor 110. The condenser 120 heat-exchanges the compressed refrigerant supplied from the compressor 110 with the coolant which flows into the condenser 120 to condense the refrigerant.

Herein, the condenser 120 may be connected through the coolant pipes 17, respectively, so that the coolant flows into and is discharged from the condenser 120 and the respective coolant pipes may be connected with the HVAC module 10.

Figure 5:
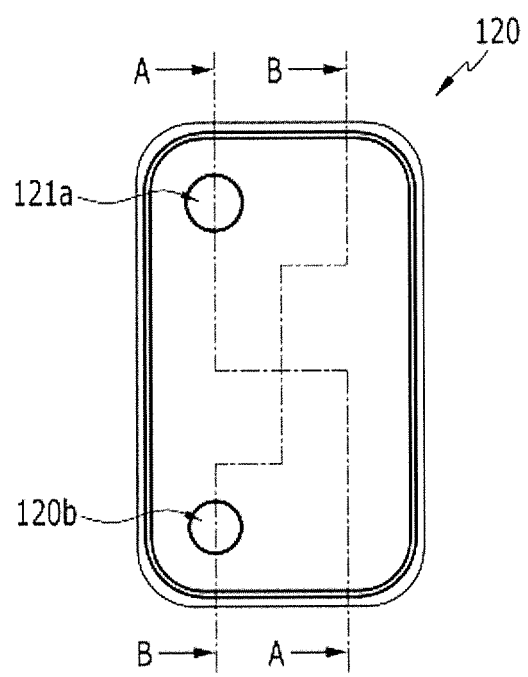
FIG. 5 is a side view of a condenser applied to the CE module for a vehicle according to the exemplary embodiment of the present disclosure.
Figure 6:
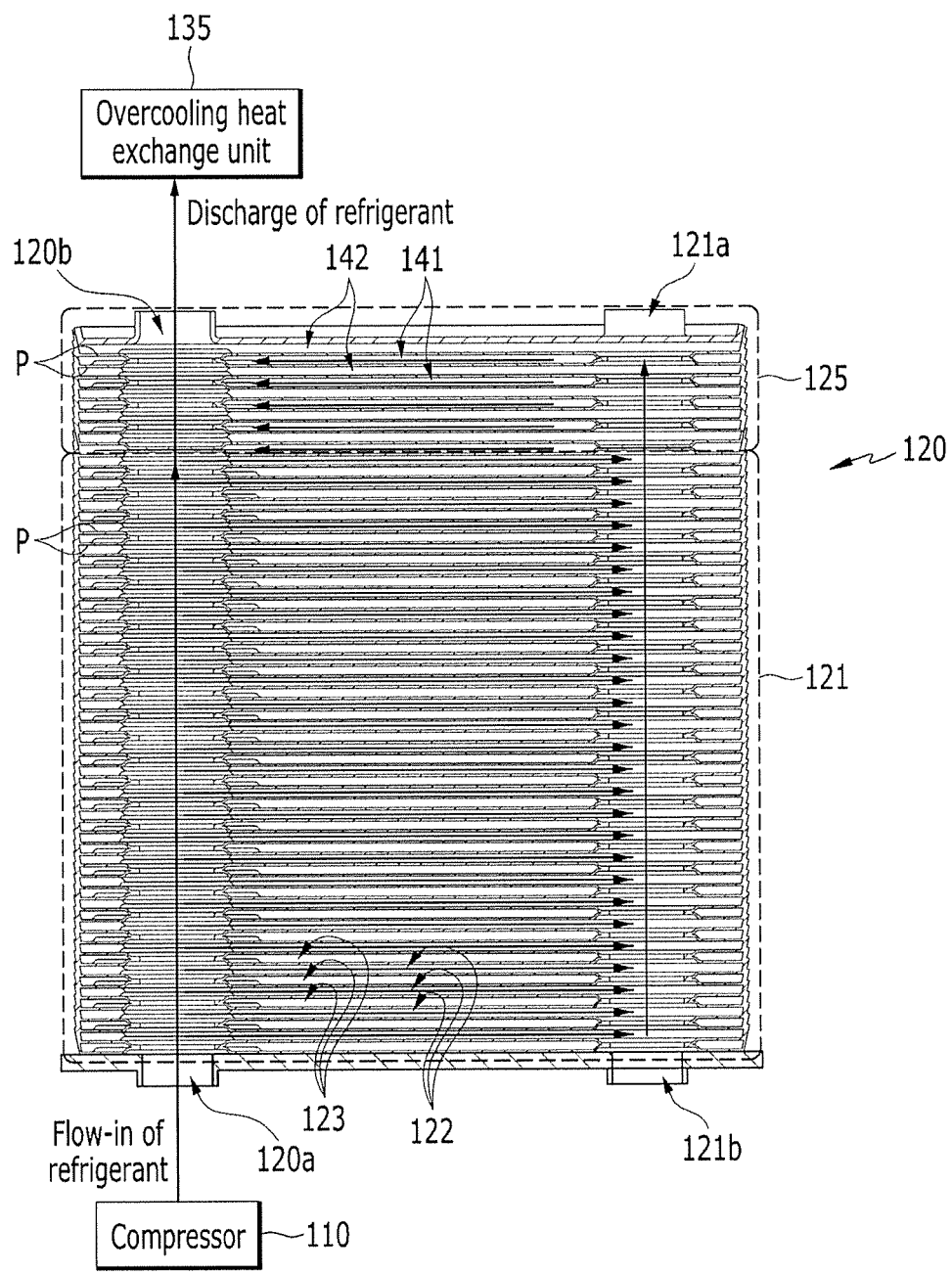
FIG. 6 is an operation state diagram illustrating the flow of refrigerant in the condenser as a cross-sectional view taken along line A-A of FIG. 5.
Figure 7:
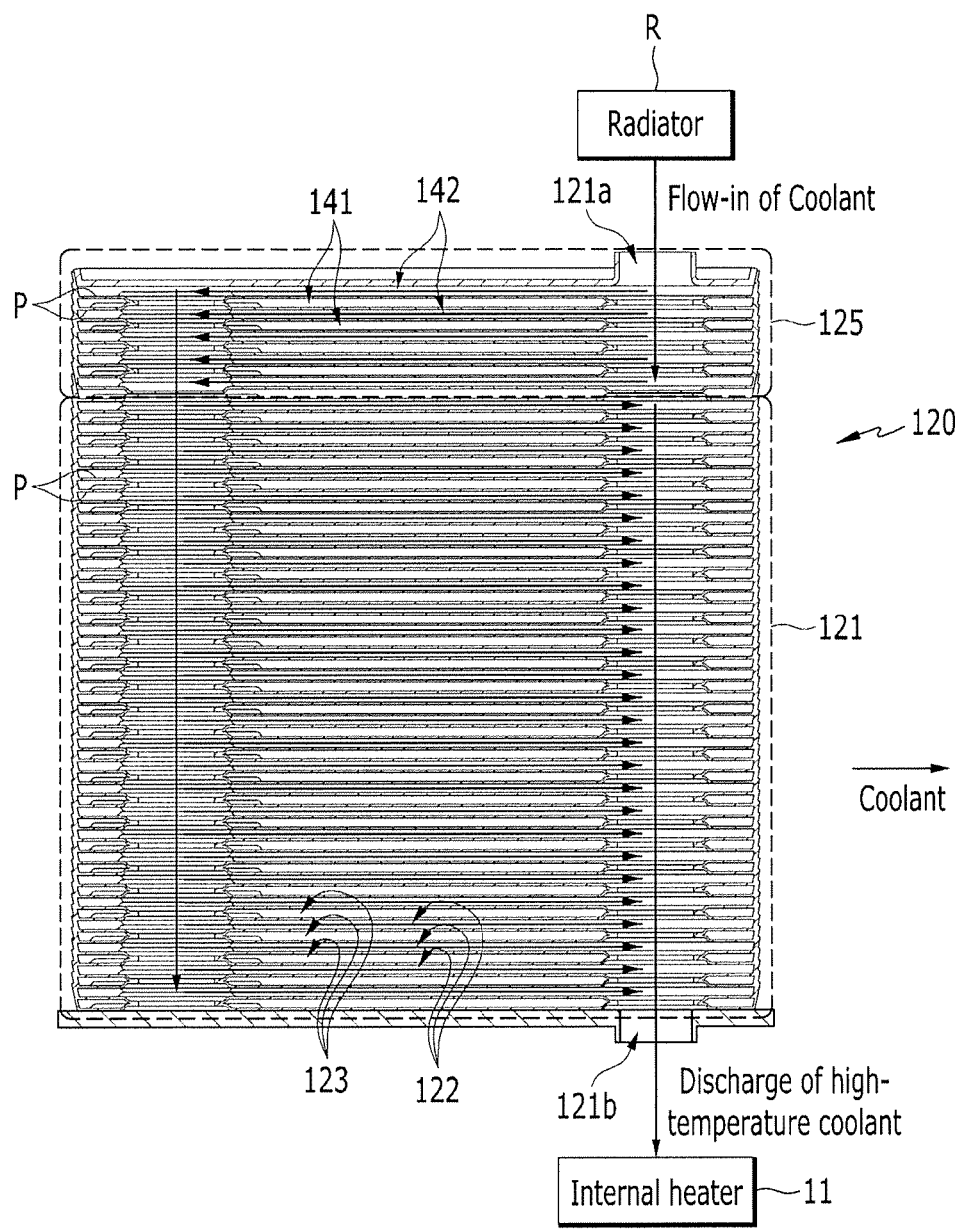
FIG. 7 is an operation state diagram illustrating the flow of coolant as a cross-sectional view taken along line B-B of FIG. 5.
Figure 8:
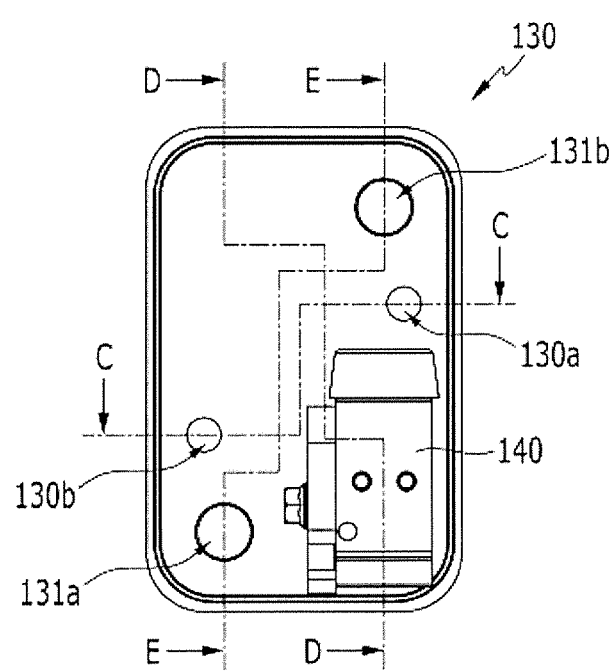
FIG. 8 is a side view of an evaporator applied to the CE module for a vehicle according to the exemplary embodiment of the present disclosure.
Figure 9:
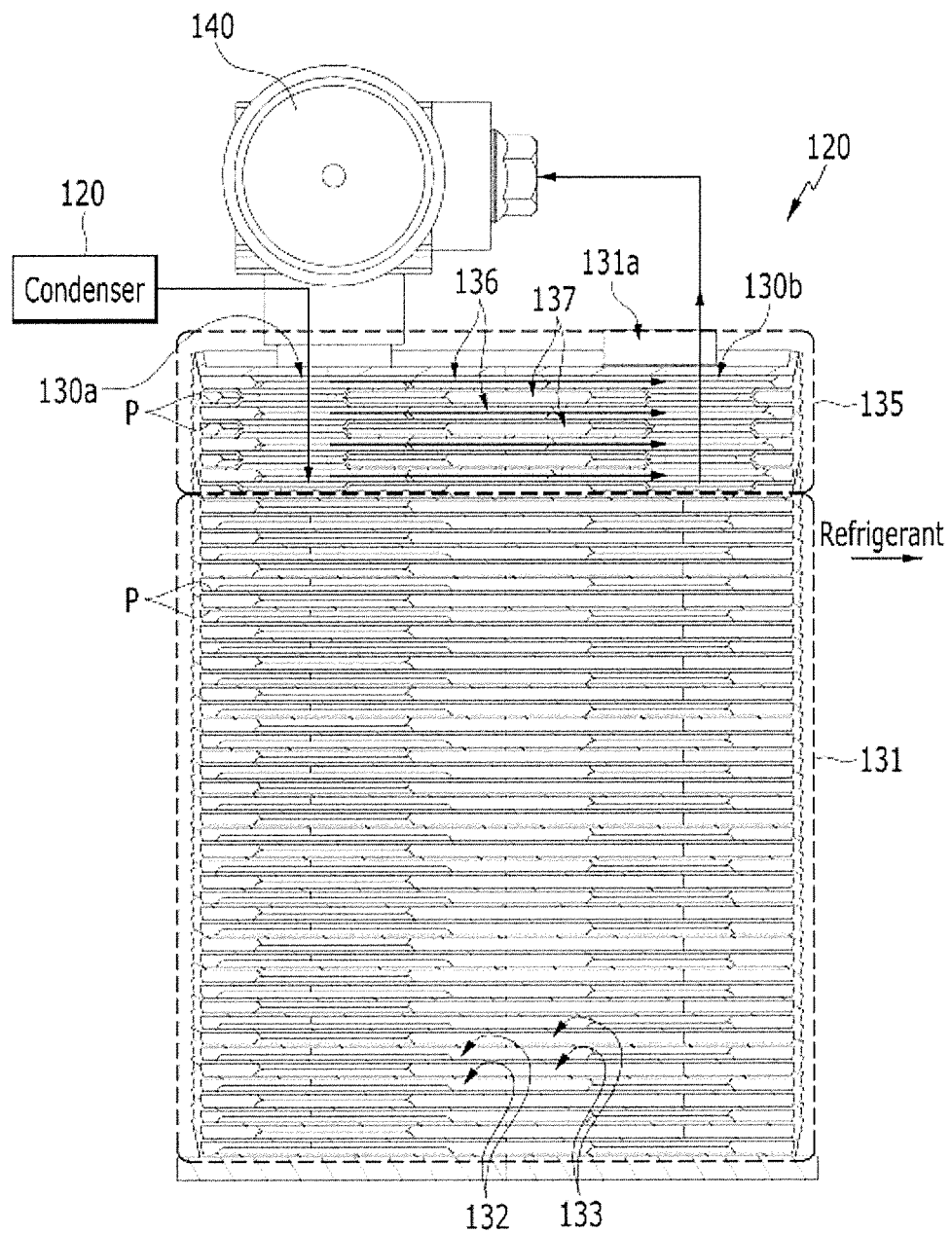
FIG. 9 is an operation state diagram illustrating the flow of the refrigerant in an overcooling heat-exchanger as a cross-sectional view taken along line C-C of FIG. 8.
Figure 10:
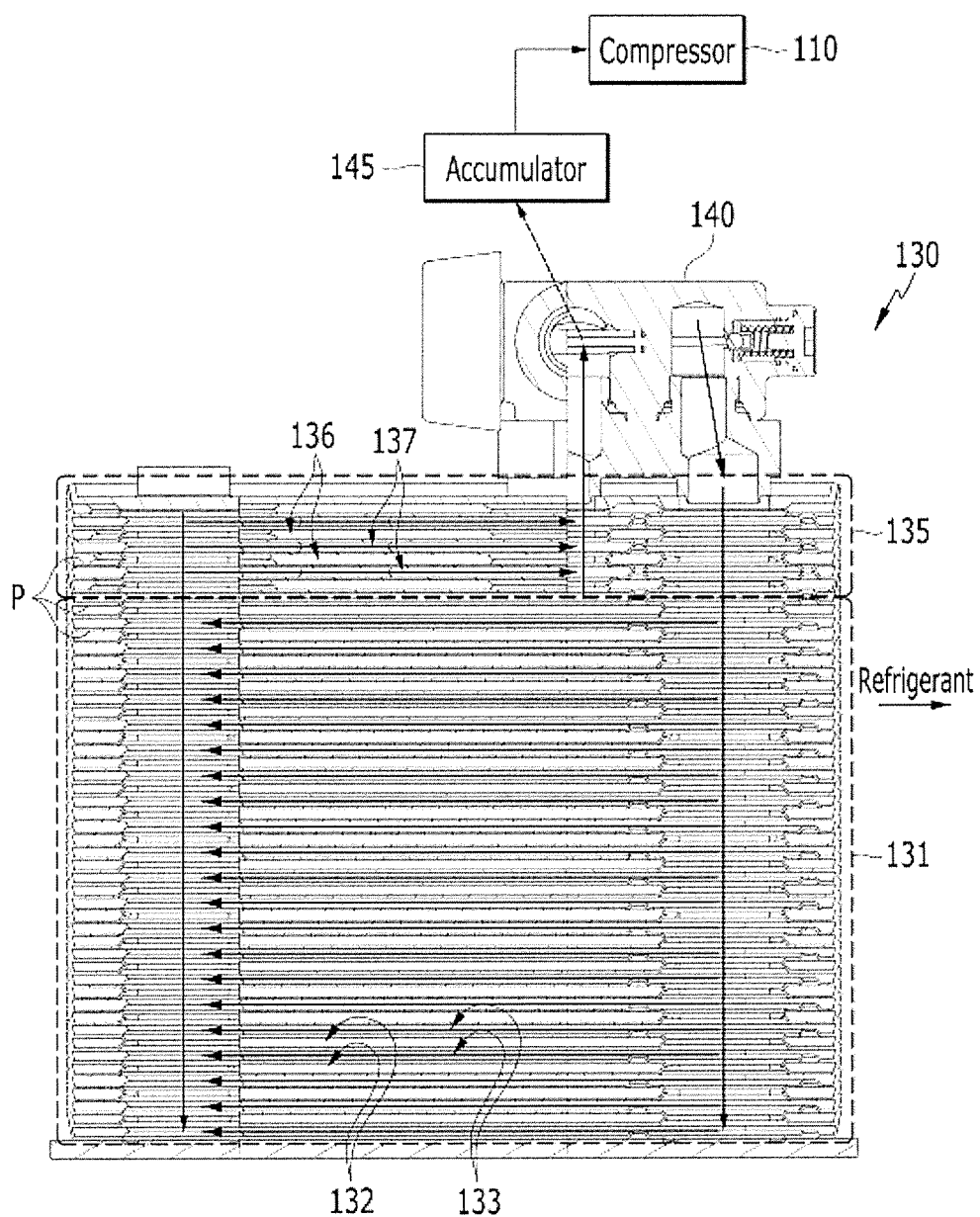
FIG. 10 is an operation state diagram illustrating the flow of the refrigerant in the evaporator as a cross-sectional view taken along line D-D of FIG. 8.
Figure 11:
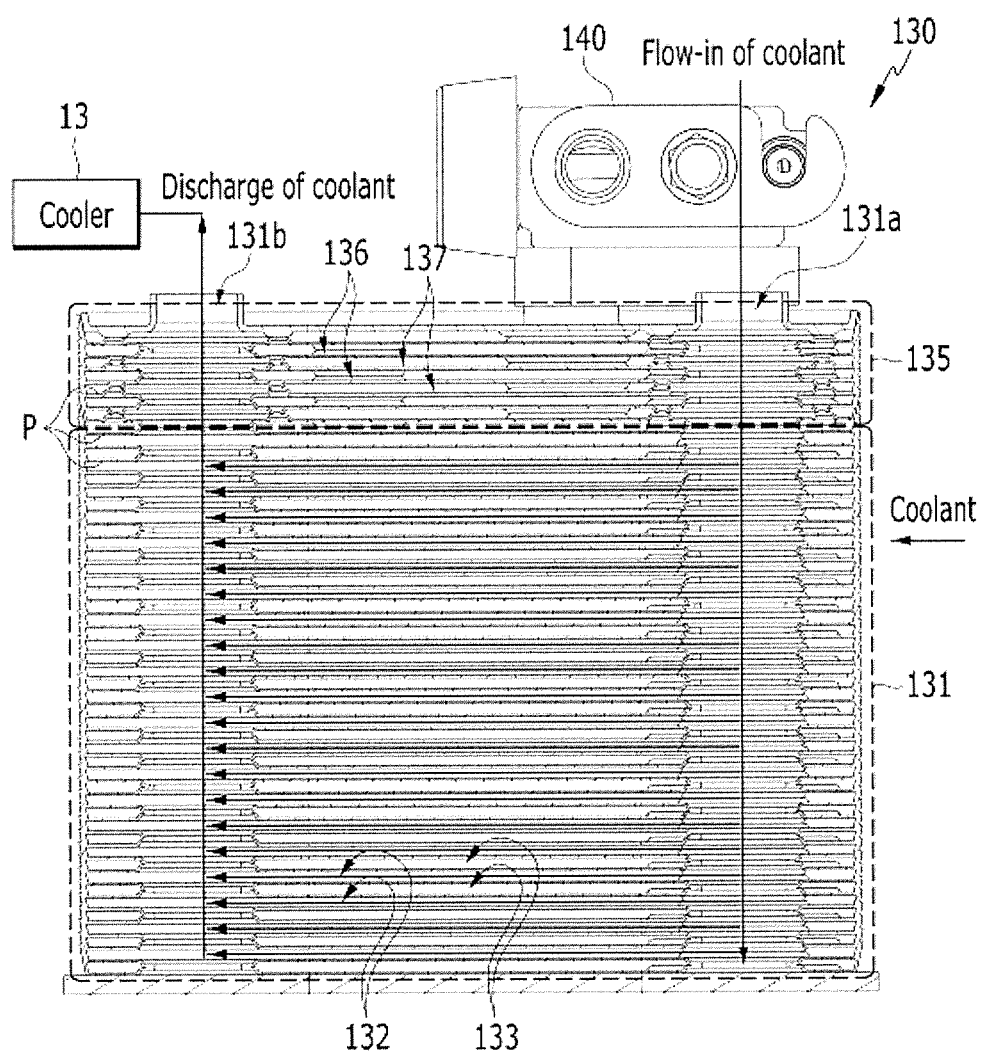
FIG. 11 is an operation state diagram illustrating the flow of the coolant in the evaporator as a cross-sectional view taken along line E-E of FIG. 8.

Referring to FIGS. 5 to 7, in the exemplary embodiment, the condenser 120 includes a condensing fin 121.

In the condensing fin 121, multiple plates P are configured to be stacked to form multiple first and second paths 122 and 123 disposed alternatively to each other, respectively. The condensing fin 121 heat-exchanges the refrigerant passing through the first paths 122 and the coolant passing through the second paths 123.

Herein, a first coolant inflow hole 121a and a first coolant discharge hole 121b are formed on one surface and the other surface, respectively based on a longitudinal direction.

The first coolant inflow hole 121a is connected with the radiator R through the coolant pipe 17. In addition, the first coolant discharge hole 121b is connected with the HVAC module 10 through the coolant pipe 17.

The first coolant inflow hole 121a is connected with the first coolant discharge hole 121b through each of the second paths 123 in the condensing fin 121. As a result, the coolant is circulated through the first coolant inflow hole 121a and the first coolant discharge hole 121b.

Herein, the condenser 120 may further include a sub condensing fin 125.

The sub condensing fin 125 is formed integrally with the condensing fin 121. In the sub condensing fin 125, multiple plates P are configured to be integrally stacked to form multiple seventh and eighth paths 141 and 142 disposed alternatively to each other.

As a result, the sub condensing fin 125 heat-exchanges the refrigerant, passed through the condensing fin 121 and passing through the second seventh paths 141, and the coolant passing through the eighth paths 142 with each other.

That is, when the refrigerant which is cooled and primarily condensed through the condensing fin 121 flows into the sub condensing fin 125, the sub condensing fin 125 may cool and secondarily condense the refrigerant through mutual heat-exchange with the coolant.

Herein, the low-temperature coolant supplied from the radiator R to the condenser 120 first passes the eighth paths 142 of the sub condensing fin 125.

As a result, the refrigerant passing through the condenser 120 is primarily condensed while passing through the condensing fin 121.

Then, the refrigerant flows into the sub condensing fin 125 and is secondarily heat-exchanged together with the low-temperature coolant which flows into the sub condensing fin 125 earlier to enhance cooling efficiency, thereby increasing condensing rate.

Herein, it is described as an exemplary embodiment that the sub condensing fin 125 is integrally provided in the condenser 120 in the exemplary embodiment, but the present disclosure is not limited thereto and the sub condensing fin 125 may not be integrally provided in the condenser 120 as necessary.

A second connection pipe 162 may be mounted at a location spaced apart from the first coolant inflow hole 121a for supplying the refrigerant to the evaporator.

The condenser 120 configured as such heat-exchanges the flow-in refrigerant with the coolant to condense the refrigerant and supplies the heat energy generated when the refrigerant is condensed to the coolant to increase the temperature of the coolant.

Accordingly, the high-temperature coolant which is heat-exchanged while passing through the condenser 120 is supplied to the internal heater 11 of the HVAC module 10 to heat the interior of the vehicle when the heating mode of the vehicle is actuated.

The condenser 120 configured as such may be formed as a water-cooled heat exchanger in which the coolant is circulated.

As a result, the refrigerant supplied from the compressor 110 is condensed through heat-exchange with the coolant while passing through the condensing fin 121 and the sub condensing fin 125.

In the exemplary embodiment, the evaporator 130 is mounted on the base plate 101 at a location spaced apart from the condenser 120. The evaporator 130 evaporates the refrigerant supplied from the expansion valve 140 which is integrally mounted through heat-exchange with the flow-in coolant and supplies the evaporated refrigerant to the compressor 110.

An overcooling heat exchanger 135 may be integrally provided in the evaporator 130, which overcools the refrigerant supplied from the condenser 120 through mutual heat exchange with low-temperature and low-pressure gas refrigerant passing through the evaporator 130 and supplies the overcooled refrigerant to the expansion valve 140.

Herein, a first refrigerant discharge hole 120b on which a second connection pipe 162 is mounted is formed at the condenser 120. Furthermore, the condenser 120 may have a first refrigerant inflow hole 120a to which the first connecting pipe 161 is mounted on the opposite side of the first refrigerant discharge hole 120b.

As a result, the condenser 120 may be connected with the overcooling heat exchanger 135 through the second connection pipe 162 mounted on the first refrigerant discharge hole 120b.

That is, the evaporator 130 may include an evaporator 131 and the overcooling heat exchanger 135 as illustrated in FIGS. 2 and 3 and 8 to 11.

First, in the evaporator 131, multiple plates P are configured to be stacked to form multiple third and fourth paths 132 and 133 disposed alternatively to each other, respectively. The evaporator 131 heat-exchanges the refrigerant, passing through the third paths 132, and the coolant passing through the fourth paths 133 with each other.

In addition, the overcooling heat exchanger 135 is integrally formed above the evaporator 131. In the overcooling heat exchanger 135, multiple plates P are configured to be stacked to form multiple fifth and sixth paths 136 and 137 disposed alternatively to each other, respectively.

The overcooling heat exchanger 135 may flow the low-temperature and low-pressure gas refrigerant supplied from the evaporator 131 to the sixth paths 137 and flow the condensed refrigerant supplied from the condenser 120 to the fifth paths 136.

That is, the refrigerant discharged from the condenser 120 passes through the overcooling heat exchanger 135 and thereafter, flows into the expansion valve 140. Then, the refrigerant may flow into the evaporator 131 while being expanded in the expansion valve 140.

As a result, the refrigerant passing through the condenser 120 flows into the overcooling heat exchanger 135 and in this case, the refrigerant is overcooled through heat-exchange with the low-temperature and low-pressure gas refrigerant which flows from the evaporator 131 to enhance the cooling efficiency, thereby increasing the condensing rate of the refrigerant.

In the evaporator 130, a second coolant inflow hole 131a and a second coolant discharge hole 131b are formed on both edges opposite to each other on one surface on which the expansion valve 140 is mounted.

The second coolant inflow hole 131a and the second coolant discharge hole 131b may be connected with the evaporator 131 by penetrating the overcooling heat exchanger 135.

That is, the second coolant inflow hole 131a and the second coolant discharge hole 131b may be formed on each corner portion in a diagonal direction on one surface of the evaporator 131 and the coolant pipes 17 may be mounted on the second coolant inflow hole 131a and the second coolant discharge hole 131b, respectively.

The second coolant inflow hole 131a is connected with the second coolant discharge hole 131b through each of the fourth paths 123 in the evaporator 131. As a result, the coolant is circulated through the second coolant inflow hole 131a and the second coolant discharge hole 131b.

Further, a second refrigerant inflow hole 130a for flowing the refrigerant supplied from the condenser 120 into the overcooling heat exchangery 135 and a second refrigerant discharge hole 130b for discharging the refrigerant passing through the fifth paths 136 may be formed in the evaporator 130.

The second connection pipe 162 may be mounted on the second refrigerant inflow hole 130a and a third connection pipe 163 connected with the expansion valve 140 may be mounted on the second refrigerant discharge hole 130b.

The evaporator 130 configured as such heat-exchanges the refrigerant which flows from the overcooling heat exchanger 135 with the coolant to evaporate the refrigerant and supplies the low-temperature heat energy generated when the refrigerant is evaporated to cool the coolant.

Accordingly, the low-temperature coolant which is heat-exchanged while passing through the evaporator 130 is supplied to the cooler 13 of the HVAC module 10 to cool the interior of the vehicle when the cooling mode of the vehicle is actuated.

The condenser 130 configured as such may be formed as the water-cooled heat exchanger in which the coolant is circulated.

In the exemplary embodiment, the expansion valve 140 may be integrally mounted on the evaporator 130. The expansion valve 140 may be connected with the overcooling heat exchanger 135 through the third connection pipe 163 and connected with the accumulator 145 through a fourth connection pipe 164.

As a result, the expansion valve 140 receives and expands the refrigerant passing through the overcooling heat exchanger 135. Herein, the expansion valve 140 is directly connected with the evaporator 131, and flows the expanded refrigerant into the third paths 132.

The refrigerant evaporated while passing through the evaporator 131 passes through the expansion valve 140 and flows into the accumulator 145 through the fourth connection pipe 164.

In this case, the expansion valve 140 may connect the fourth connection pipe 164 and the evaporator 131 through a separate path formed therein.

The expansion valve 140 may be configured as a mechanical type or an electronic type.

The accumulator 145 is connected with the evaporator 130 through the expansion valve 140, and may supply only a gaseous refrigerant among the evaporated refrigerants to the compressor 110 while passing through the evaporator 130.

The accumulator 145 stores a liquid refrigerant at the inside thereof in order to supply only a gas refrigerant to the compressor 110, vaporizes the stored liquid refrigerant, and supplies again a gas refrigerant to the compressor 110, thereby improving efficiency and durability of the compressor 110.

Herein, the accumulator 145 may be connected with the compressor 110 through a fifth connection pipe 165.

In addition, the cover housing 150 is mounted on the base plate 101 so that the compressor 110, the condenser 120, the evaporator 130, and the accumulator 145 are positioned in the cover housing 150.

In addition, the cover housing 150 may prevent the compressor 110, the condenser 120, the evaporator 130, the expansion valve 140, and the accumulator 145 mounted on the base plate 101 from being exposed to the outside.

As described above, according to the exemplary embodiment of the present disclosure, when the CE module 100 for a vehicle is applied, the heat energy generated from refrigerant when the refrigerant is condensed and evaporated is selectively heat-exchanged and the temperature of the interior of the vehicle is controlled by using each of the low-temperature or high-temperature coolant which is heat-exchanged to simplify a whole system and simplify a layout of the connection pipe in which the refrigerant is circulated.

Further, the CE module 100 for a vehicle can enhance operation efficiency by using high-performance R152-a or R744 refrigerant and prevent noise, vibration, and operation instability as compared with an air conditioner means in the related art.

Furthermore, manufacturing cost can be reduced and a weight can be reduced through modularization of an apparatus and spatial utilization can be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A centralized energy (CE) module for a vehicle, comprising:
   a base plate;
   a compressor mounted on the base plate and compressing a refrigerant;
   a condenser mounted on the base plate at a location spaced apart from the compressor, the condenser heat-exchanging the compressed refrigerant supplied from the compressor with a coolant which flows into the condenser to condense the refrigerant;
   an evaporator disposed on the base plate at a location spaced apart from the condenser, evaporating the refrigerant supplied from an expansion valve, which is integrally mounted, through heat-exchange with the coolant which flows into the evaporator, and supplying the evaporated refrigerant to the compressor; and
   an accumulator connected with the evaporator through the expansion valve, and supplying only a low-temperature and low-pressure gas refrigerant among the evaporated refrigerant to the compressor while the gas refrigerant passing through the evaporator.

2. The CE module of claim 1, wherein:
the evaporator includes an overcooling heat exchanger integrated therein, so that the overcooling heat exchanger overcools the refrigerant supplied from the condenser through mutual heat-exchange with the gas refrigerant passing through the evaporator and which supplies the overcooled refrigerant to the expansion valve.

3. The CE module of claim 2, wherein:
the condenser includes a condensing fin having multiple first and second paths disposed alternatively to each other, respectively, therein by stacking multiple plates and heat-exchanging the refrigerant passing through the first paths and the coolant passing through the second paths with each other.

4. The CE module of claim 3 wherein:
the compressor is connected with the condenser through a first connection pipe,
the condenser is connected with the overcooling heat exchanger through a second connection pipe,
the expansion valve is connected with the overcooling heat exchanger through a third connection pipe and is connected with the accumulator through a fourth connection pipe, and
the accumulator is connected with the compressor through a fifth connection pipe.

5. The CE module of claim 3, wherein:
the condenser further includes a sub condensing fin having multiple seventh and eighth paths disposed alternatively to each other therein by integrally stacking multiple plates and heat-exchanging the refrigerant passing through the seventh paths and the coolant passing through the eighth paths with each other.

6. The CE module of claim 5, wherein:
the coolant, which flows into the condenser, first passes through the sub condensing fin and flows into the condensing fin.

7. The CE module of claim 2, wherein:
the evaporator includes an evaporator having multiple third and fourth paths disposed alternatively to each other therein by stacking multiple plates and heat-exchanging the refrigerant passing through the third paths and the coolant passing through the fourth paths with each other.

8. The CE module of claim 7, wherein:
the evaporator includes the overcooling heat exchanger integrated therein, and the overcooling heat exchanger has multiple fifth and sixth paths disposed alternatively to each other, respectively, therein by stacking multiple plates.

9. The CE module of claim 8, wherein:
the overcooling heat exchanger flows the low-temperature and low-pressure gas refrigerant supplied from the evaporator to the sixth paths and flows the condensed refrigerant supplied from the condenser to the fifth paths.

10. The CE module of claim 2, wherein:
the refrigerant, which is discharged from the condenser, passes through the overcooling heat exchanger and flows into the evaporator through the expansion valve.

11. The CE module of claim 1, wherein:
the evaporator and the condenser are connected with each other through coolant pipes so that the coolant flows into and is discharged from the evaporator and the condenser, and
the respective coolant pipes are connected with a heating, ventilation, and air conditioning (HVAC) module.

12. The CE module of claim 11, wherein:
a high-temperature coolant, which is heat-exchanged while passing through the condenser, is supplied to the HVAC module to heat an interior of a vehicle when a heating mode of the vehicle is actuated.

13. The CE module of claim 11, wherein:
a low-temperature coolant, which is heat-exchanged while passing through the evaporator, is supplied to the HVAC module to cool the interior of the vehicle when a cooling mode of the vehicle is actuated.

14. The CE module of claim 1, wherein:
the condenser and the evaporator includes a water-cooled heat exchanger in which the coolant is circulated.

15. The CE module of claim 1, wherein:
the refrigerant includes R152-a or R744 refrigerant.

16. The CE module of claim 1, wherein:
on the base plate, a cover housing is disposed so that the compressor, the condenser, the evaporator, and the accumulator are disposed in the cover housing.

17. The CE module of claim 1, wherein:
between the base plate and the compressor, at least one damper is mounted.

* * * * *